(12) United States Patent
Ueda et al.

(10) Patent No.: US 9,438,781 B2
(45) Date of Patent: Sep. 6, 2016

(54) LIGHT EMITTING DEVICE HAVING FUNCTION FOR PROTECTION AGAINST STATIC ELECTRICITY, AND IMAGE PICKUP APPARATUS

(71) Applicant: CANON KABUSHIKI KAISHA, Tokyo (JP)

(72) Inventors: Haruhisa Ueda, Tokyo (JP); Soichiro Oya, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 14/503,658

(22) Filed: Oct. 1, 2014

(65) Prior Publication Data

US 2015/0098015 A1  Apr. 9, 2015

(30) Foreign Application Priority Data

Oct. 4, 2013  (JP) .................................. 2013-209228
Sep. 3, 2014  (JP) .................................. 2014-179014

(51) Int. Cl.
*H04N 5/222* (2006.01)
*H04N 5/225* (2006.01)

(52) U.S. Cl.
CPC .......... *H04N 5/2256* (2013.01); *H04N 5/2254* (2013.01)

(58) Field of Classification Search
CPC ............. H04N 5/2256; H04N 5/2354; G03B 2215/05
USPC .......... 348/370, 68, 371, 373, 374; 396/155; 362/3

See application file for complete search history.

(56) References Cited

U.S. PATENT DOCUMENTS

| | | | | |
|---|---|---|---|---|
| 3,855,495 A | * | 12/1974 | Pappas ...................... | H01J 5/56 313/318.02 |
| 7,108,406 B2 | | 9/2006 | Moriyasu et al. | |
| 2001/0051045 A1 | * | 12/2001 | Kobayashi ............. | G03B 17/04 396/178 |
| 2007/0025719 A1 | * | 2/2007 | Kashiwagi ............... | G03B 9/04 396/164 |
| 2011/0182569 A1 | * | 7/2011 | Momose ................ | G03B 15/05 396/178 |
| 2011/0188848 A1 | * | 8/2011 | Sotsu ..................... | G03B 17/00 396/542 |

FOREIGN PATENT DOCUMENTS

| | | |
|---|---|---|
| JP | 61013544 A | 1/1986 |
| JP | 2005063688 A | 3/2005 |

* cited by examiner

*Primary Examiner* — Sinh Tran
*Assistant Examiner* — Xi Wang
(74) *Attorney, Agent, or Firm* — Rossi, Kimms & McDowell LLP (57) ABSTRACT

A mechanism excellent in assembly workability of a light emitting device and capable of stably protecting a soldered portion between a lead wire and the electrode part of a flash discharge tube against static electricity. A strobe panel scatters light emitted by the flash discharge tube. A strobe base holds the strobe panel. A strobe cover is attached to the strobe base in a manner covering the flash discharge tube and the strobe panel. An elastic case shields between a gap between the strobe base and the strobe cover meet and the electrode part of the flash discharge tube, and between another gap between the strobe base and the strobe panel and the electrode part of the flash discharge tube. A non-conductive elastic adhesive is filled between the elastic case and the electrode part in a manner sealing the electrode part.

4 Claims, 8 Drawing Sheets

LIGHT EMITTING DEVICE HAVING FUNCTION FOR PROTECTION AGAINST STATIC ELECTRICITY, AND IMAGE PICKUP APPARATUS

BACKGROUND OF THE INVENTION

1. Field of the Invention

The invention relates to a light emitting device incorporated in an image pickup apparatus, such as a digital camera or a digital video camera, and an image pickup apparatus equipped with the light emitting device.

2. Description of the Related Art

A strobe device incorporated in an image pickup apparatus, such as a digital camera or a digital video camera, has a strobe base on which are disposed a flash discharge tube, a reflector that reflects light emitted from the flash discharge tube toward an object, and a strobe panel that scatters the reflected light from the reflector. The strobe device is covered with a strobe cover. The flash discharge tube has electrode parts to which are soldered lead wires for current supply, respectively.

By the way, in recent years, with the downsizing of a strobe device caused by downsizing of an image pickup apparatus, the distance between a gap in an area where the strobe cover and the strobe base meet and each electrode part of the flash discharge tube has become shorter, which makes the electrode part of the flash discharge tube prone to be shorted out by external static electricity. For this reason, a technique for protecting the electrode parts of the flash discharge tube is under development so as to prevent external static electricity from causing a short circuit.

For example, there have been proposed a technique in which a lead wire is passed through a tube-like elastic member and the elastic member is thermally shrunk at a location where the lead wire is soldered to the associated electrode part of the flash discharge tube to thereby provide insulation protection for the electrode part of the flash discharge tube, and a technique in which a silicon adhesive is anchored to a location where the lead wire and the associated electrode part of the flash discharge tube are soldered (see Japanese Patent Laid-Open Publication No. S61-13544).

Further, there has been proposed a technique in which a holding part formed with holes in which electrode parts of the flash discharge tube are fitted, respectively, and an enclosure shape extending from portions close to the holes are integrally formed using an insulating material excellent in elasticity, whereby the electrode parts are held and also soldered portions are protected (see Japanese Patent Laid-Open Publication No. 2005-63688).

However, the technique disclosed in Japanese Patent Laid-Open Publication No. S61-13544 has a problem of poor assembly workability. For example, in the technique in which the electrode parts of the flash discharge tube are protected by the tube-shaped elastic member, it takes time to perform work for passing each tube-like elastic member over the lead wire associated therewith, and further there is a fear that the tube-shaped elastic member is broken during the work. Further, in the technique in which the silicon adhesive is anchored, it is required to apply the silicon adhesive such that the soldered portion is positively covered with the silicon adhesive, while controlling the amount of the adhesive by visual estimation thereof. Therefor, the quality of resistance to static electricity depends on an individual worker and cannot be made uniform.

On the other hand, in the technique disclosed in Japanese Patent Laid-Open Publication No. 2005-63688, since the insulating material excellent in elasticity is used not only for holding the electrode parts, but also for protecting the soldered portions, assembly workability is improved. However, since the insulating material only encloses the soldered portions, the technique disclosed in Japanese Patent Laid-Open Publication No. 2005-63688 is inferior in protection against static electricity to the technique disclosed in Japanese Patent Laid-Open Publication No. S61-13544.

SUMMARY OF THE INVENTION

The invention provides a mechanism which makes excellent the assembly workability of a light emitting device and provides stable protection of a soldered portion between a lead wire and the electrode part of a flash discharge tube against static electricity.

In a first aspect of the invention, there is provided a light emitting device comprising a light emitting element having an electrode part to which a lead wire is connected, a panel member configured to scatter light emitted by the light emitting element, a base member configured to hold the panel member, a cover member attached to the base member in a manner covering the light emitting element and the panel member, and a shielding member formed of a non-conductive material and configured to shield between a first gap formed at an area where the base member and the cover member meet and the electrode part of the light emitting element, wherein the shielding member shields between a second gap formed at an area where the base member and the panel member meet and the electrode part of the light emitting element, and wherein a non-conductive adhesive is filled between the shielding member and the electrode part of the light emitting element such that the electrode part is sealed.

In a second aspect of the invention, there is provided a light emitting device comprising a light emitting element having an electrode part to which a lead wire is connected, a panel member formed of a non-conductive material and configured to scatter light emitted by the light emitting element, a base member configured to hold the panel member, and a cover member attached to the base member in a manner covering the light emitting element and the panel member, wherein the panel member has a shielding part integrally formed therewith, wherein the shielding part shields between a first gap formed at an area where the base member and the cover member meet and the electrode part of the light emitting element, wherein the shielding part shields between a second gap formed at an area where the base member and the panel member meet and the electrode part of the light emitting element, and wherein a non-conductive adhesive is filled between the shielding part and the electrode part of the light emitting element such that the electrode part is sealed.

In a third aspect of the invention, there is provided an image pickup apparatus comprising a light emitting element having an electrode part to which a lead wire is connected, a panel member configured to scatter light emitted by the light emitting element, a base member configured to hold the panel member, a cover member attached to the base member in a manner covering the light emitting element and the panel member, and a shielding member formed of a non-conductive material and configured to shield between a first gap formed at an area where the base member and the cover member meet and the electrode part of the light emitting element, wherein the shielding member shields between a second gap formed at an area where the base member and the panel member meet and the electrode part of the light emitting element, and wherein a non-conductive adhesive is filled between the shielding member and the electrode part of the light emitting element such that the electrode part is sealed.

In a fourth aspect of the invention, there is provided an image pickup apparatus comprising a light emitting element having an electrode part to which a lead wire is connected, a panel member formed of a non-conductive material and configured to scatter light emitted by the light emitting element, a base member configured to hold the panel member, and a cover member attached to the base member in a manner covering the light emitting element and the panel member, wherein the panel member has a shielding part integrally formed therewith, wherein the shielding part shields between a first gap formed at an area where the base member and the cover member meet and the electrode part of the light emitting element, wherein the shielding part shields between a second gap formed at an area where the base member and the panel member meet and the electrode part of the light emitting element, and wherein a non-conductive adhesive is filled between the shielding part and the electrode part of the light emitting element such that the electrode part is sealed.

According to the invention, it is possible to provide the mechanism which makes excellent the assembly workability of the light emitting device and provides stable protection of the soldered portion between the lead wire and the electrode part of the flash discharge tube against static electricity.

Further features of the invention will become apparent from the following description of exemplary embodiments (with reference to the attached drawings).

BRIEF DESCRIPTION OF THE DRAWINGS

FIG. 5A is a cross-sectional view taken on line A-A of FIG. 4.

DESCRIPTION OF THE EMBODIMENTS

The invention will now be described in detail below with reference to the accompanying drawings showing embodiments thereof.

Figure 1:
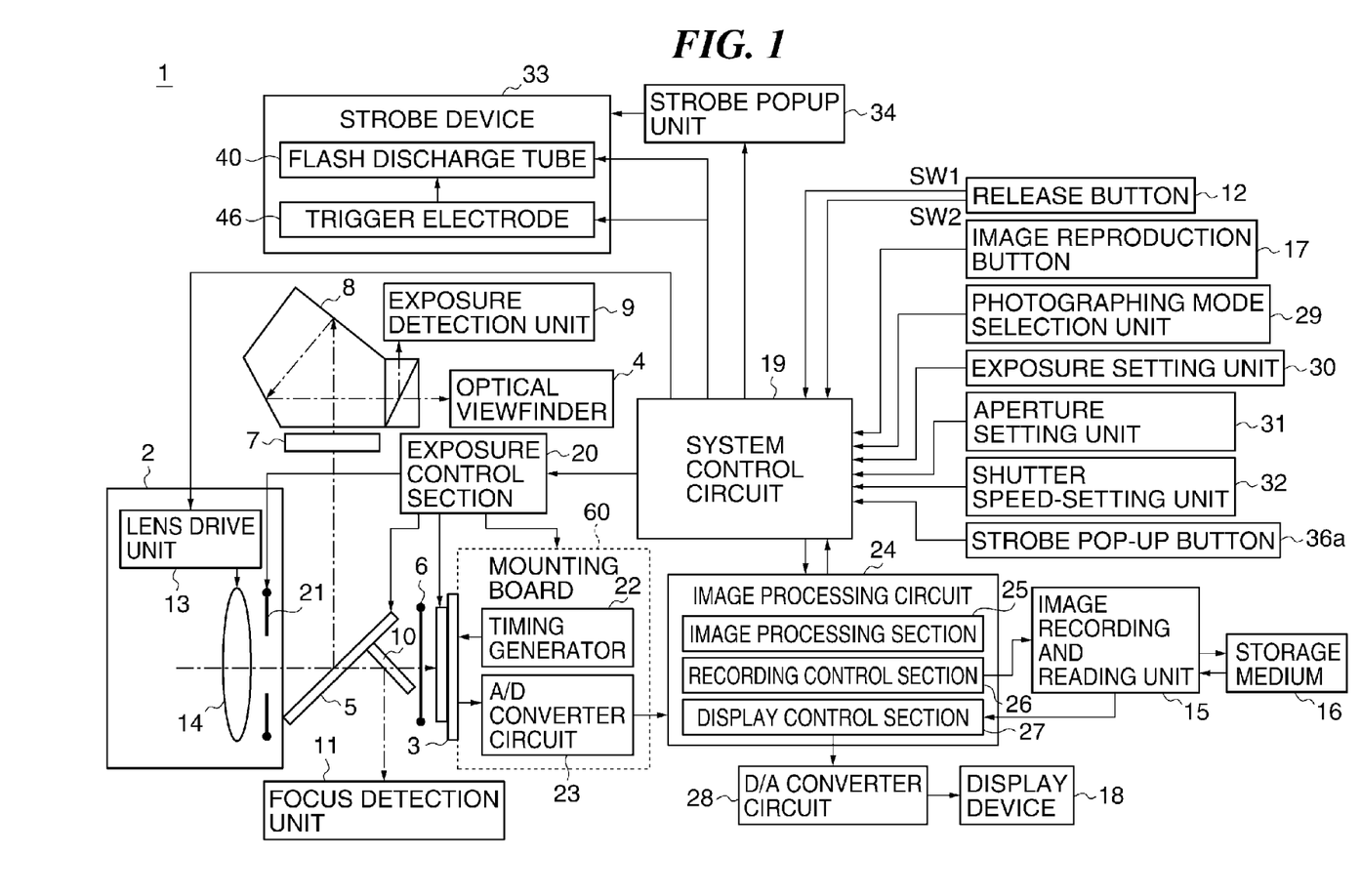
FIG. 1 is a schematic block diagram of a digital single-lens reflex camera incorporating a strobe device which is a light emitting device according to an embodiment of the invention.
Figure 2A:
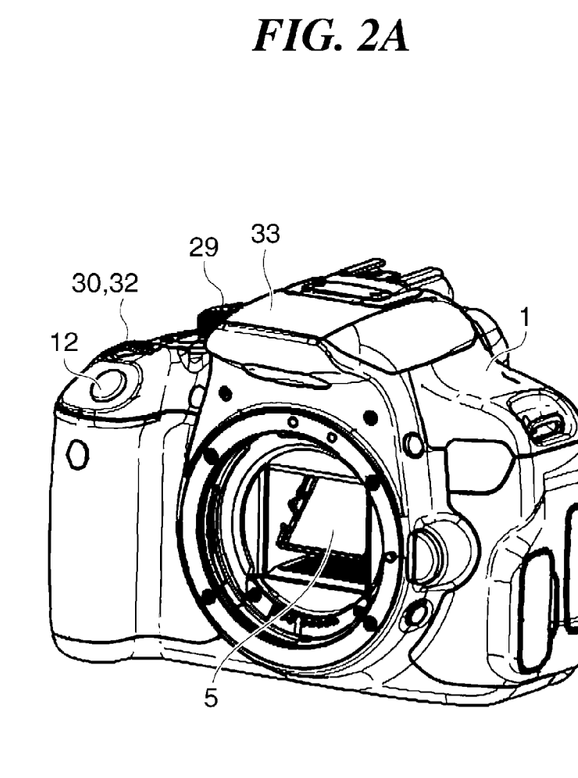
FIG. 2A is a front perspective view of a camera body of the digital single-lens reflex camera incorporating the strobe device.
Figure 2B:
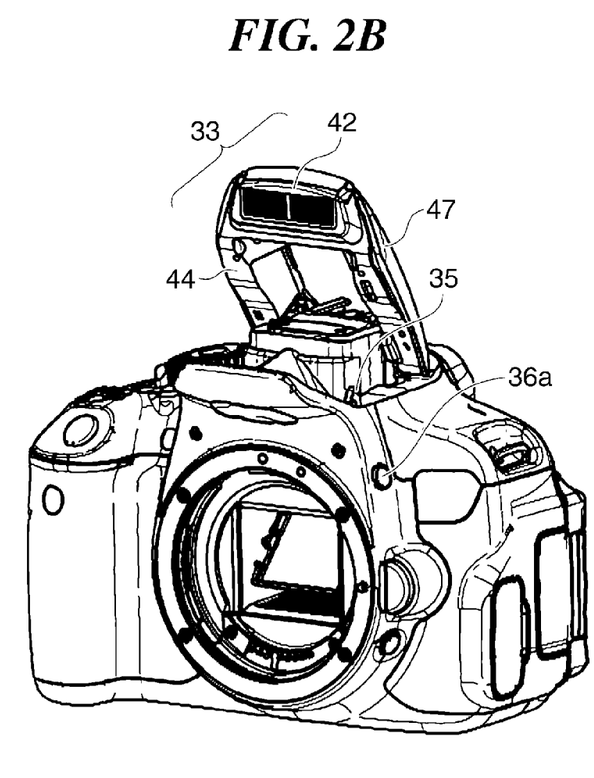
FIG. 2B is a perspective view of the camera body, shown in FIG. 2A, in a state in which the strobe device is held up to a light emitting position.

FIG. 1 is a schematic block diagram of a digital single-lens reflex camera incorporating a strobe device which is a light emitting device according to an embodiment of the invention. FIG. 2A is a front perspective view of a camera body 1 of the digital single-lens reflex camera incorporating the strobe device, in a state in which a lens unit 2 is removed therefrom, and FIG. 2B is a perspective view of the camera body 1, shown in FIG. 2A, in a state in which the strobe device is held up to a light emitting position. Note that in the present embodiment, the digital single-lens reflex camera for which the lens unit 2 is exchangeable will be described as an example of the image pickup apparatus of the invention, but this is not limitative.

The digital single-lens reflex camera of the present embodiment has the lens unit 2 exchangeably provided on the front side (object side) of the camera body 1 shown in FIGS. 1, 2A, and 2B. Light having passed through the lens unit 2 forms an image on an image pickup unit 3. The image pickup unit 3, which is implemented e.g. by a CCD sensor or a CMOS sensor, is held in the camera body 1 in a manner positionally adjustable at least in the optical axis direction of the lens unit 2.

Between the lens unit 2 and the image pickup unit 3, there are arranged a main mirror 5, a sub mirror 10, and a shutter 6. Light reflected from the main mirror 5 forms an image on a focus plate 7 and then is guided to an optical viewfinder 4 by a pentagonal prism 8, while being partially guided to an exposure detection unit 9. The main mirror 5 is formed as a half mirror, and part of light having passed through the main mirror 5 is reflected by the sub mirror 10 pivotally attached to the main mirror 5, to enter a focus detection unit 11.

When a user half presses a release button 12 (SW1), photometry by the exposure detection unit 9, ranging by the focus detection unit 11, and driving of a focus lens 14 by a lens drive unit 13 are started. When the user fully presses the release button 12 (SW2), the main mirror 5 and the shutter 6 are driven, whereby light from the lens unit 2 enters the image pickup unit 3.

Then, the image pickup unit 3 performs an exposure operation for starting a charge accumulation and charge reading operation. Analog image data output from the image pickup unit 3 is converted to digital image data by an analog-to-digital converter circuit 23, and is subjected to predetermined image processing by an image processing circuit 24, whereafter it is recorded and stored as a photographed image in a storage medium 16 mounted in an image recording and reading unit 15. When an image reproduction button 17 is pressed, the image stored in the storage medium 16 is displayed on a display device 18.

A system control circuit 19 controls the overall operation of the camera. The system control circuit 19, which is formed e.g. by a CPU or an MPU, controls the operations of respective circuits and so forth. When ranging is started, the system control circuit 19 controls the lens drive unit 13, based on an output from the focus detection unit 11, to perform a focusing operation by driving the focus lens 14 in the optical axis direction. Further, the system control circuit 19 cause an exposure control section 20 to control a diaphragm 21 of the lens unit 2, the main mirror 5, the shutter 6, and a timing generator 22. Note that the timing generator 22 and the analog-to-digital converter circuit 23 are mounted on a mounting board 60.

The main mirror 5 is movable to a mirror-up position retracted from a photographic optical path, and the sub mirror 10 is also movable to the mirror-up position retracted from the photographic optical path by being folded onto the main mirror 5. The shutter 6 has a front curtain and a rear curtain and controls transmission and blocking of a light flux from the lens unit 2. When photometry is started, the system control circuit 19 determines an aperture value and a shutter speed value according to an output from the exposure detection unit 9 and photographing conditions preset by the user.

When a photographing operation is started by operation of the release button 12 (SW2), the system control circuit 19 causes the exposure control section 20 to control the diaphragm 21 to the determined aperture value. Further, the system control circuit 19 causes the exposure control section 20 to bring the main mirror 5 and the sub mirror 10 into the mirror-up position and control travel of the front and rear curtains of the shutter 6 according to the determined shutter speed value. Furthermore, the system control circuit 19 operates the exposure control section 20 to cause the timing generator 22 to output a pulse signal required for driving the image pickup unit 3.

The image pickup unit 3 performs a charge accumulation and charge reading operation according to the pulse signal output from the timing generator 22. An electric charge read out from the image pickup unit 3 is converted to a digital value by the analog-to-digital converter circuit 23 and is sent as digital data to the image processing circuit 24. The sent digital data is subjected to white balance adjustment, image compression processing, etc. by an image processing section 25 of the image processing circuit 24, and then a recording control section 26 causes the image recording and reading unit 15 to store the processed data in the storage medium 16 as image data.

When the image reproduction button 17 is pressed, the image data stored in the storage medium 16 is read into a display control section 27 of the image processing circuit 24 by the image recording and reading unit 15, and is then converted to an analog image by a digital-to-analog converter circuit 28 to be displayed on the display device 18.

Next, a description will be given of a method of setting photographing conditions. A photographing mode selection unit 29 as an operation member is capable of setting photographing modes, such as an automatic exposure mode, an aperture priority exposure mode (Av), a shutter-speed priority exposure mode (Tv), a manual mode (M), and a bulb mode (B). In a case where the automatic exposure mode is set, a photographer can correct an exposure value to an appropriate one, as desired, using an exposure setting unit 30 as a dial operation member, whereby the aperture value and the shutter speed value are automatically set during photographing such that the appropriate exposure value is obtained.

In a case where any of the aperture priority exposure mode (Av), the shutter-speed priority exposure mode (Tv), and the manual mode (M) is set, it is possible to set the aperture value and the shutter speed value to respective desired values, as desired, using an aperture setting unit 31 and a shutter speed-setting unit 32. In a case where the bulb mode is set, when the release button 12 (SW2) is pressed, photographing is started, and exposure is continued as long as the release button 12 (SW2) is kept pressed. Then, when the release button 12 (SW2) is released, the exposure is terminated, whereby the shutter speed can be determined during photographing.

Figure 3:
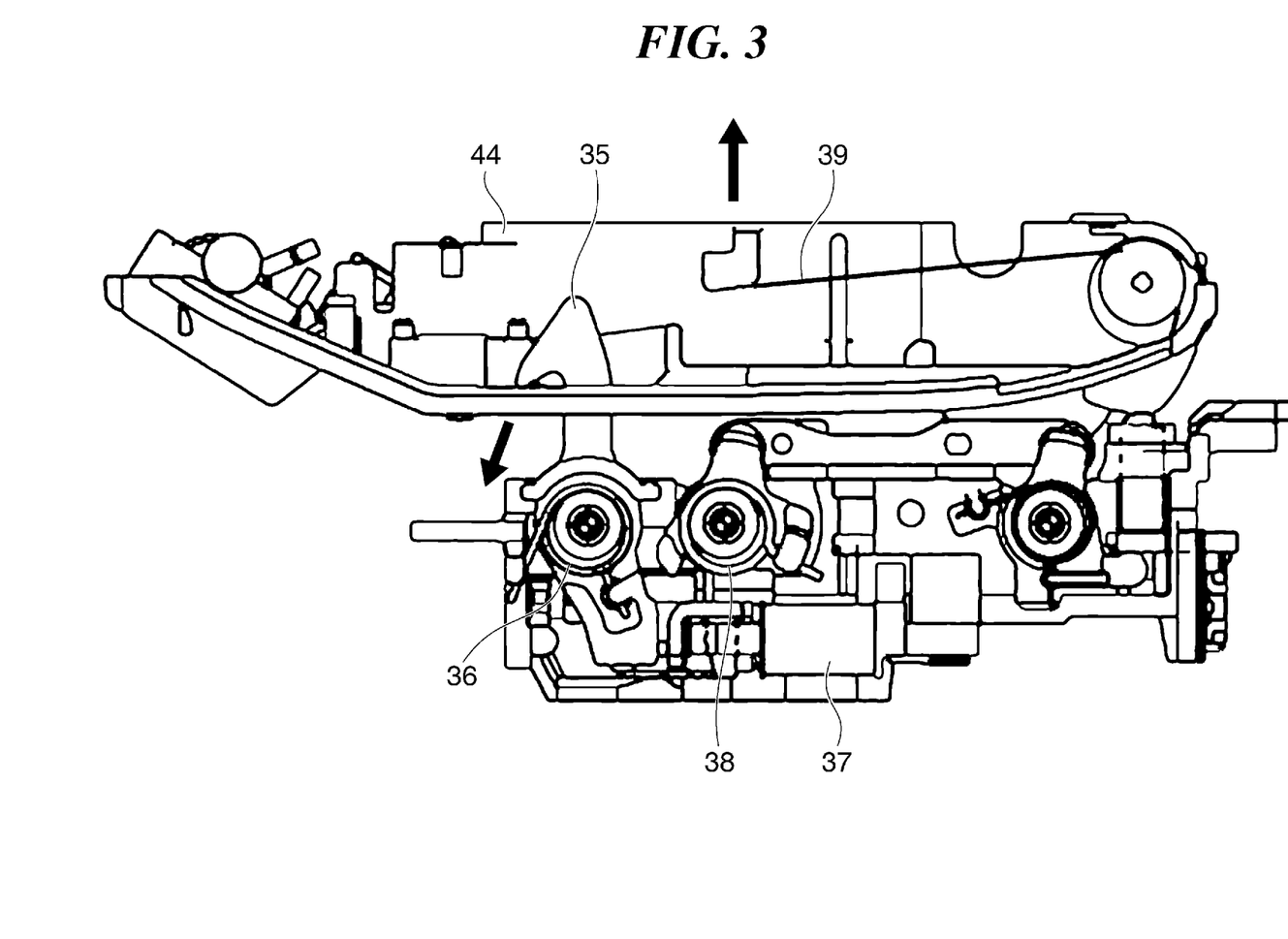
FIG. 3 is a schematic view of a strobe popup unit.
Figure 4:
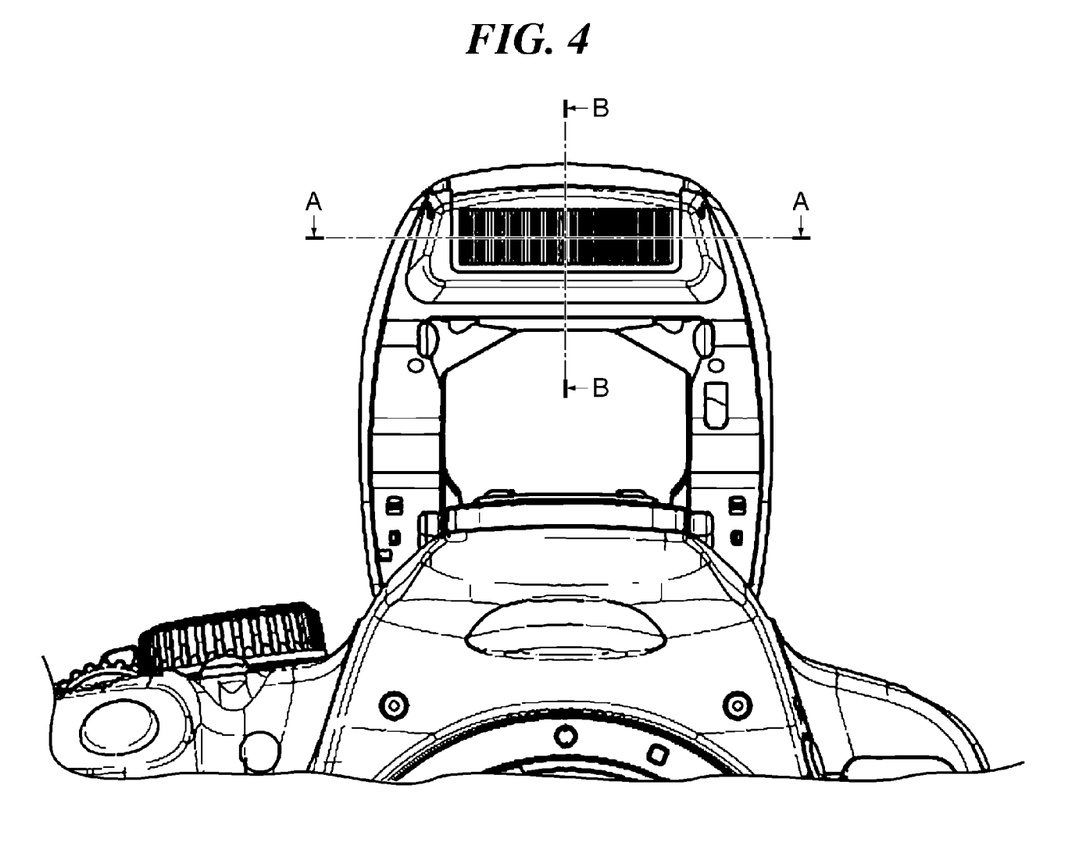
FIG. 4 is a front view of the strobe device in a state held up to the light emitting position.
Figure 5A:
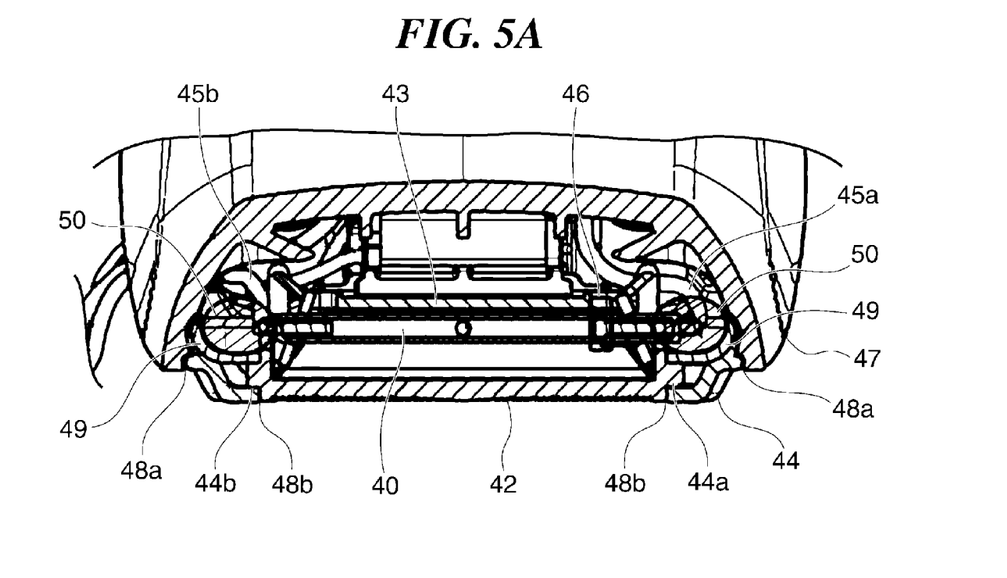
Figure 5B:
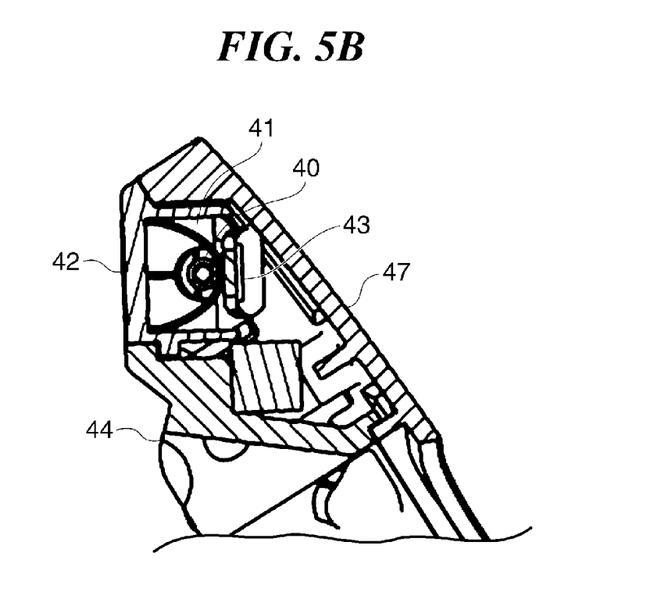
FIG. 5B is a cross-sectional view taken on line B-B of FIG. 4, each of which shows a case where a shielding member for protecting a soldered portion of an electrode part of a flash discharge tube is formed by a non-conductive elastic case.
Figure 6:
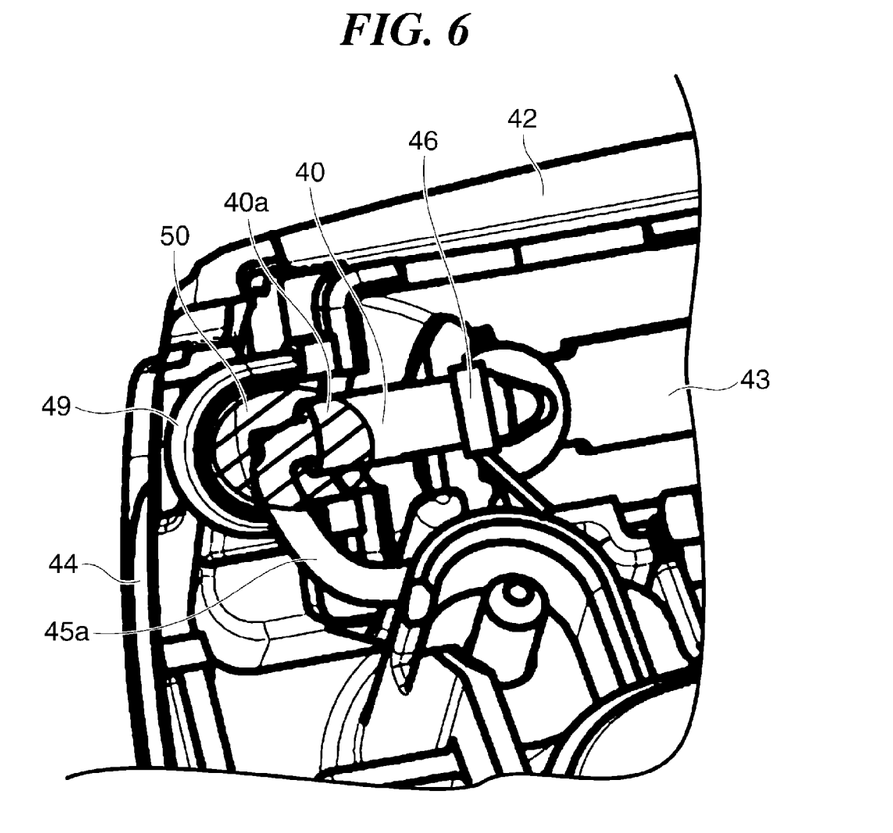
FIG. 6 is an enlarged view of an essential part of FIG. 5A.

Next, a strobe device 33 as the light emitting device will be described with reference to FIGS. 1 and 3 to 6. FIG. 3 is a schematic view of a strobe popup unit 34. FIG. 4 is a front view of the strobe device 33 in a state held up to the light emitting position. FIG. 5A is a cross-sectional view taken on line A-A of FIG. 4, and FIG. 5B is a cross-sectional view taken on line B-B of FIG. 4. FIG. 6 is an enlarged view of an essential part of FIG. 5A.

The strobe popup unit 34 is configured to open and close the strobe device 33. As shown in FIG. 3, the strobe popup unit 34 is provided with a retaining lever 35 for retaining the strobe device 33 in a closed state (see FIG. 2A). The retaining lever 35 is urged by a coil spring 36 in a direction in which the strobe device 33 is closed. Further, the strobe popup unit 34 is provided with a solenoid 37. The solenoid 37 is comprised of a permanent magnet, a coil, and a magnetic chip as a movable part. In a state in which the coil is not energized, the chip is retained by the magnetic force of the permanent magnet.

When a strobe pop-up button 36*a* as an operation member is pressed by the user, the coil is energized to cancel out the magnetic force of the permanent magnet, whereby the chip is moved by the urging force of a coil spring 38. The moved chip causes rotation of the retaining lever 35 to thereby release retainment of a strobe base 44 of the strobe device 33. As a consequence, the strobe device 33 is brought up to the light emitting position by the urging force of a strobe-up spring 39. The strobe base 44 functions as a base member in the invention.

When the release button 12 (SW2) is operated to start a photographing operation, the system control circuit 19 causes the exposure control unit 20 to cause light emission of the strobe device 33 and exposure of the image pickup unit 3 by controlling the amount of light to be emitted from the strobe device 33, the aperture value, and the shutter speed value, such that appropriate exposure is obtained. Further, in the automatic exposure mode, when it is determined by the exposure detection unit 9 that the luminance of an object is below a predetermined luminance, the system control circuit 19 automatically releases the retainment of the strobe base 44 of the strobe device 33 and brings the strobe device 33 up to the light emitting position. An operation for closing the strobe device 33, i.e. moving the same to its accommodated position is manually performed by the user.

As shown in FIGS. 5A and 5B, the strobe device 33 includes a flash discharge tube 40 that emits light by being energized, a reflector 41 that reflects the light emitted from the flash discharge tube 40 toward an object, and a strobe panel 42 that scatters the reflected light. A portion of the strobe panel 42 through which light transmits has a Fresnel shape whereby light is substantially uniformly scattered toward a object. The strobe panel 42 functions as a panel member in the invention. Lead wires 45*a* and 45*b* are soldered to electrode parts 40*a* provided at opposite ends of the flash discharge tube 40, respectively. The lead wires 45*a* and 45*b* are connected to a capacitor, not shown.

Further, the flash discharge tube 40 has a trigger electrode 46 connected to a trigger capacitor, not shown. When causing the flash discharge tube 40 to emit light, xenon gas within the flash discharge tube 40 is ionized by an electric discharge from the trigger electrode 46, whereby electric charge in the capacitor is discharged from the electrode parts 40*a* of the flash discharge tube 40 to which the lead wires 45*a* and 45*b* are connected, to cause light emission.

The flash discharge tube 40 is secured to the reflector 41 via an elastic member 43. The reflector 41 is secured to strobe panel 42 e.g. by bonding. The strobe panel 42 is held on the strobe base 44 by being secured to opposite ends 44*a* and 44*b* of the strobe base 44 by bonding and the like. The strobe base 44 has a strobe cover 47 attached thereto. The strobe cover 47 functions as a cover member in the invention.

The strobe cover 47 is attached to the strobe base 44 such that it covers the flash discharge tube 40, the reflector 41, and the strobe panel 42. Thus, the flash discharge tube 40 and the reflector 41 are disposed in a space surrounded by the strobe panel 42, the strobe base 44, and the strobe cover 47.

By the way, a gap 48a is formed at an area where the strobe base 44 and the strobe cover 47 meet, and a gap 48b is formed at an area where the strobe base 44 and the strobe panel 42 meet, as shown in FIG. 5A. For this reason, there is a fear that static electricity having passed through the gaps 48a and 48b reaches the electrode parts 40a of the flash discharge tube 40 to short out circuits within the camera. To prevent occurrence of such a short circuit, in the invention, non-conductive elastic cases 49 are provided on the respective electrode parts 40a of the flash discharge tube 40. Each elastic case 49 functions as a shielding member in the invention.

As shown in FIGS. 5A and 6, the elastic case 49 is formed into a semi-cylindrical shape, using an elastic and heat-resistant material, such as silicone rubber. Each of the elastic cases 49 is fitted in grooves formed in the strobe panel 42 and the strobe base 44, whereby it is secured to the strobe panel 42 and the strobe base 44. The elastic case 49 is disposed such that the inner peripheral surface of the semi-cylindrical shape faces an associated one of the electrode parts 40a of the flash discharge tube 40 so as to shield between the electrode part 40a and an associated one of the gaps 48a and 48b. This makes it possible to prevent static electricity having passed through the gaps 48a and 48b from reaching the electrode parts 40a of the flash discharge tube 40. Further, a space inside the inner peripheral surface of the semi-cylindrical shape of each of the elastic cases 49 is filled with a non-conductive elastic adhesive 50 to seal the electrode parts 40a of the flash discharge tube 40. This makes it possible to prevent invasion of static electricity from end openings of the respective elastic cases 49.

Since the elastic case 49 has a semi-cylindrical shape and elasticity, as described above, it is possible to easily assemble the elastic case 49 to the strobe panel 42 and the strobe base 44 in a state in which the flash discharge tube 40 having the lead wires soldered to the respective electrode parts 40a thereof and the reflector 41 have been assembled to the strobe panel 42.

Further, since the elastic case 49 is formed of a heat-resistant material, it is also possible to solder the lead wires 45a and 45b to the respective electrode parts 40a of the flash discharge tube 40 after the elastic cases 49 have been attached to the strobe panel 42 and the strobe base 44.

Furthermore, since the elastic adhesive 50 is filled in a space inside the inner peripheral surface of the semi-cylindrical elastic case 49, it is possible to easily control the elastic adhesive 50 to an appropriate amount. This makes it possible to uniformly maintain the thickness of the elastic adhesive 50 to thereby stabilize resistance to static electricity.

Next, a description will be given, with reference to FIGS. 7 and 8, of the main construction of a second embodiment of the invention.

An image pickup apparatus according to the second embodiment has the same construction as that of the digital single-lens reflex camera incorporating the strobe device according to the first embodiment described with reference to FIGS. 1 to 6, except a shielding structure for protecting the soldered portions within the strobe device. Therefore, the same component elements are denoted by the same reference numerals, respectively, and description thereof is omitted. The following description is given of only different points from the first embodiment.

In the first embodiment, the non-conductive elastic cases 49 formed as separate members from the strobe panel 42 are used as shielding members for shielding between the electrode parts 40a of the flash discharge tube 40 and the respective gaps 48a and 48b.

Figure 7:
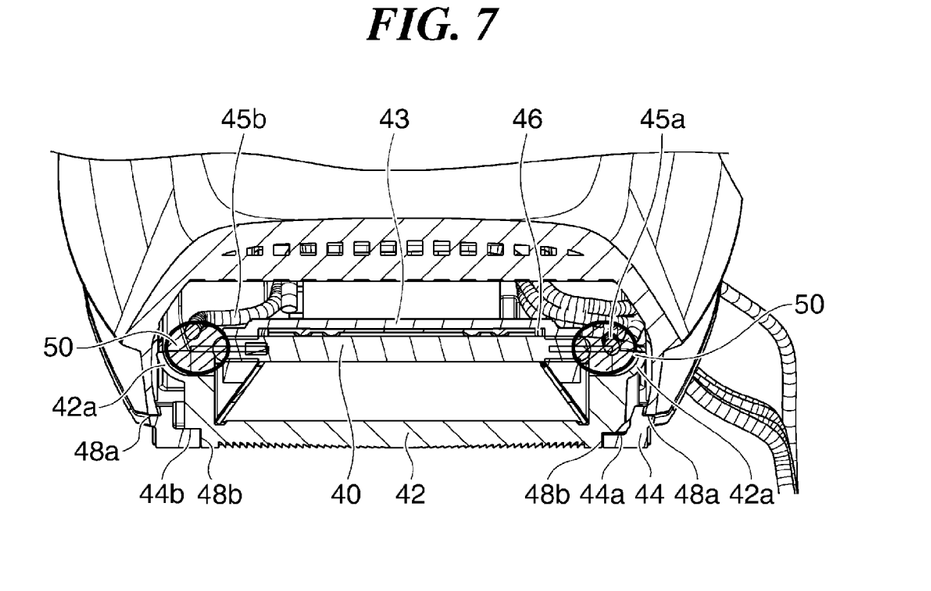
FIG. 7 is a cross-sectional view taken on line A-A of FIG. 4.
Figure 8:
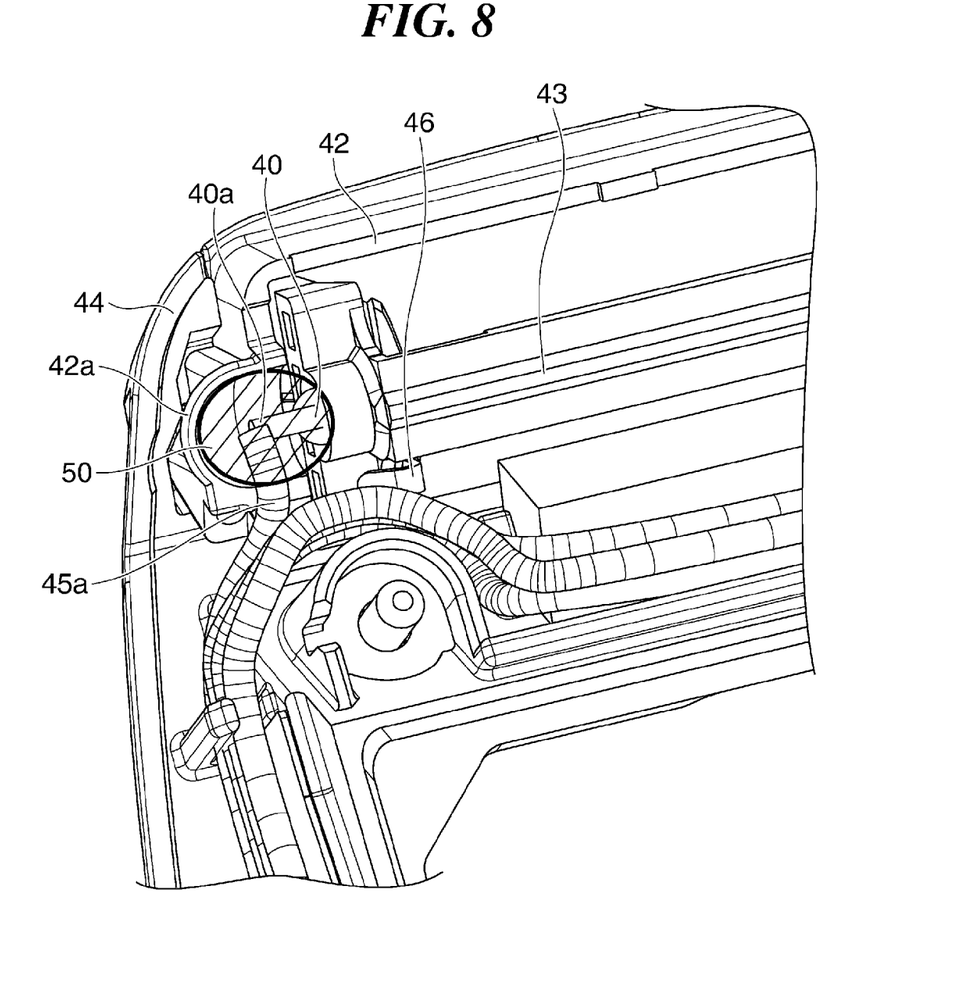
FIG. 8 is an enlarged view of an essential part of FIG. 7, which shows a case where a strobe panel is integrally formed with a shielding part for protecting the soldered portion of the electrode part of the flash discharge tube.

In contrast, in the present embodiment, as shown in FIGS. 7 and 8, shielding parts 42a integrally formed with the non-conductive strobe panel 42 are provided, without using separate members, as shielding members for protecting the soldered portions of the respective electrode parts 40a of the flash discharge tube 40.

Since the shielding parts 42a for protection of the respective soldered portions are integrally formed with the strobe panel 42, it is possible not only to reduce the number of component parts to thereby reduce manufacturing costs, but also to simplify work for assembling the strobe panel 42, the flash discharge tube 40, the reflector 41, the elastic member 43, and the strobe base 44.

Further, the elastic adhesive 50 is filled in a space inside the inner peripheral surface of the shielding parts 42a of the strobe panel 42, so that it is possible to easily control the elastic adhesive 50 to an appropriate amount, which makes it possible to uniformly maintain the thickness of the elastic adhesive 50 to thereby stabilize resistance to static electricity.

The above-described first and second embodiments described above can each provide a mechanism which is excellent in assembly workability of the strobe device 33 and is capable of stably protecting soldered portions between the lead wires 45a and 45b and the respective electrode parts 40a of the flash discharge tube 40 against static electricity.

While the invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2013-209228 filed Oct. 4, 2013 and Japanese Patent Application No. 2014-179014 filed Sep. 3, 2014, which are hereby incorporated by reference herein in its entirety.

What is claimed is:

1. A light emitting device comprising:
   a light emitting element having an electrode part to which a lead wire is connected;
   a panel member configured to scatter light emitted by said light emitting element;
   a base member configured to hold said panel member;
   a cover member attached to said base member in a manner covering said light emitting element and said panel member; and
   a shielding member formed of a non-conductive material and configured to shield between a first gap formed at an area where said base member and said cover member meet and said electrode part of said light emitting element,
   wherein said shielding member shields between a second gap formed at an area where said base member and said panel member meet and said electrode part of said light emitting element, wherein a non-conductive adhesive is filled between said shielding member and said electrode part of said light emitting element such that said electrode part is sealed, and wherein said shielding member is secured to said panel member and said base member, by being fitted in grooves formed respectively in said panel member and said base member.

2. The light emitting device according to claim 1, wherein said shielding member is formed of an elastic and heat-resistant material.

3. An image pickup apparatus comprising:
a light emitting element having an electrode part to which a lead wire is connected;
a panel member configured to scatter light emitted by said light emitting element;
a base member configured to hold said panel member;
a cover member attached to said base member in a manner covering said light emitting element and said panel member; and
a shielding member formed of a non-conductive material and configured to shield between a first gap formed at an area where said base member and said cover member meet and said electrode part of said light emitting element,
wherein said shielding member shields between a second gap formed at an area where said base member and said panel member meet and said electrode part of said light emitting element,
wherein a non-conductive adhesive is filled between said shielding member and said electrode part of said light emitting element such that said electrode part is sealed, and
wherein said shielding member is secured to said panel member and said base member, by being fitted in grooves formed respectively in said panel member and said base member.

4. The image pickup apparatus according to claim 3, wherein said shielding member is formed of an elastic and heat-resistant material.

\* \* \* \* \*